Patented Dec. 12, 1933

1,939,290

UNITED STATES PATENT OFFICE 1,939,290

PRODUCTION OF CELLULAR SOLID BODIES

John William Battersby, London, England

No Drawing. Application May 12, 1930, Serial No. 451,867, and in Great Britain May 17, 1929

4 Claims. (Cl. 106—30)

It is known that ordinary commercial waterglass solution when heated swells up and becomes porous. The porous mass, however, has the disadvantage of very low mechanical strength and moreover it will not withstand damp, under the influence of which it deliquesces. Owing to these disadvantages such porous materials have not hitherto been useful commercially.

By the present invention a porous cellular body of adequate mechanical strength, resistant to moisture and possessing valuable heat insulating properties, electrical insulating properties and capacity to resist fire is produced. These advantages are obtained by using as a starting material a form of alkali metal silicate which is solid, colloidal, soluble and water-containing, and as described in United States patent specification No. 1,176,613, is produced by grinding neutral fused silicate glass in the presence of water in a machine wherein there is a rolling abrasive action produced by means of flintstones or other masses of heavy abrasive material. By this process a concentrated non-alkaline solution is produced which sets to a hard, glassy, water-containing solid in the colloidal state which is soluble even in cold water and differs widely in its physical properties both from the initial silicate glass (which is for all practical purposes insoluble) and also from the material produced by drying off a commercial solution of waterglass.

The starting material made as above described, is heated in a suitable oven under light pressure or constraint to a temperature generally between 200° C. and 500° C., although temperatures lower even than 200° C. may be employed. The higher the temperature the greater the resistance to moisture of the final product, but the temperature should not be high enough to fuse the material. The temperature is maintained for from 2 to 8 hours, depending on the degree of expansion desired.

Although the starting material is usually employed in the solid coherent form, it may also be in the form of powder, which on heating forms a coherent cellular mass the fineness of grain of which is determined by the fineness of the powder, other things being equal.

As already stated, the starting material is produced by allowing the concentrated solution to set, which it does in a relatively short time even at room temperature. When the starting material is manufactured in the factory in which the expanding process is carried out, time may be saved by placing the concentrated solution directly into the oven, without waiting for it to set. The initial heating very soon drives off the excess water and the solid starting material thus formed then begins to expand on further heating.

When slabs or sheets are to be made, the material in the tray is covered by a weighted plate which keeps the material under control and exerts pressure on it during the expansion. The final density of the product may be varied by varying this pressure.

When making moulded articles, the proportion of the volume of the mould occupied by the starting material is of course determined by the density which it is desired that the product shall have, and the temperature to which it is raised, and the length of time during which it is kept at that temperature, are determined by experiment in order to ensure that the mould shall be completely filled. The mould is of course provided with suitable vents to enable the gases and vapours evolved to escape.

Fillers such as coke breeze, cotton waste, asbestos waste or pumice powder may be incorporated in the material during manufacture, and reinforcements such as wire netting, expanded metal and the like may also be included in the material. In all such cases it is preferred to employ the starting material in the form of powder, as aforesaid, in order to facilitate the incorporation of the fillers or the correct location of the reinforcement.

Much the same procedure is employed in making a cellular powder, except that the temperature is brought up to a higher figure rapidly to expand the silicate more rapidly and to produce a body which either breaks up spontaneously or is so friable as to be broken up easily.

An advantageous manner of proceeding in the case of powder is to carry a preliminary heating so far that not all the water is driven off, but by rapid heating there is a coarse expansion. The coarse cellular body is then broken down in a crusher, and the resulting powder is found to be relatively heavy. This powder is then heated further to the desired temperature, say up to 500° C. and is vigorously agitated all the time until it is completely expanded. The surprising result is obtained that on an average this powder increases in total volume to about four times its original bulk. The process of preparing the powder may be carried out in a rotary kiln, and there is no limitation to a temperature of 500° C. as the temperature may be carried up to 750° or even 800° C. with good results as these temperatures are considerably below the fusing point of the material.

The invention is not limited to the methods used above; for example, various means may be employed to control the expansion and the rate of expansion. In making slabs or other moulded bodies, the moulding may be effected in closed moulds which are weighted or otherwise enclosed in such a manner that they can yield to allow for the necessary expansion.

Some of the applications of the new material have already been mentioned, but in addition to applications depending upon the heat insulating or electrical insulating properties of the material, it may be mentioned that the open cellular structure of the material renders it most efficient as a drying agent in the treatment of air or other gases. Furthermore, it is, relatively speaking, refractory, and can be used instead of asbestos for many purposes, and could be employed, for example, in the moulding of the so-called radiants which are employed in gas fires.

For the purposes of the present invention a starting material containing a high proportion of silica is preferred, for example one containing 3½ to 4 parts of $SiO_2$ to one part of $Na_2O$. The invention is not concerned with untreated silicate glass, which is almost wholly insoluble in water at normal temperature, nor is it concerned with so-called silicates containing a large proportion of sodium carbonate or sodium hydroxide.

I claim:—

1. A process for the preparation of a cellular solid alkali silicate, characterized by the property of being moisture resisting, comprising subjecting a water containing colloidal readily soluble alkali silicate containing substantially 3.5 to 4 parts $SiO_2$ to 1 part $Na_2O$, to a temperature of from substantially 200° C. to 500° C.

2. A process for the preparation of a cellular solid alkali silicate, characterized by the property of being moisture resisting, comprising triturating a neutral fused silicate glass in the presence of water, allowing the resulting soluble silicate mass to set, and subjecting said mass to a temperature of substantially 200° C. to substantially 500° C. for substantially two to eight hours.

3. As an article of manufacture, a cellular alkali silicate characterized by the property of being moisture-resisting made by subjecting a water containing colloidal readily soluble alkali silicate containing substantially 3.5 to 4 parts $SiO_2$ to 1 part $Na_2O$ to a temperature of from substantially 200° C to 500° C.

4. As an article of manufacture, a cellular solid alkali silicate characterized by the property of being moisture-resisting made by triturating a neutral fused silicate glass in the presence of water, allowing the resulting soluble silicate mass to set, and subjecting said mass to a temperature of substantially 200° C. to substantially 500° C. for substantially two to eight hours.

J. W. BATTERSBY.